United States Patent
Long

(10) Patent No.: US 9,607,042 B2
(45) Date of Patent: Mar. 28, 2017

(54) SYSTEMS AND METHODS FOR OPTIMIZING DATABASE QUERIES

(71) Applicant: MasterCard International Incorporated, Purchase, NY (US)

(72) Inventor: Kenneth L. Long, O'Fallon, MO (US)

(73) Assignee: MasterCard International Incorporated, Purchase, NY (US)

( * ) Notice: Subject to any disclaimer, the term of this patent is extended or adjusted under 35 U.S.C. 154(b) by 264 days.

(21) Appl. No.: 14/486,706

(22) Filed: Sep. 15, 2014

(65) Prior Publication Data

US 2015/0081666 A1    Mar. 19, 2015

Related U.S. Application Data

(60) Provisional application No. 61/878,300, filed on Sep. 16, 2013.

(51) Int. Cl.
*G06F 17/30* (2006.01)

(52) U.S. Cl.
CPC .. *G06F 17/30442* (2013.01); *G06F 17/30451* (2013.01); *G06F 17/30584* (2013.01)

(58) Field of Classification Search
CPC ............... G06F 17/30; G06F 17/30442; G06F 17/30584; G06F 17/30451
USPC .................................................. 707/600–899
See application file for complete search history.

(56) References Cited

U.S. PATENT DOCUMENTS

| | | |
|---|---|---|
| 7,080,062 B1 | 7/2006 | Leung et al. |
| 7,136,848 B2 | 11/2006 | Carlson et al. |
| 7,146,365 B2 | 12/2006 | Allen et al. |
| 7,191,174 B2 | 3/2007 | Day et al. |
| 7,941,426 B2 | 5/2011 | Bestgen et al. |
| 7,991,763 B2 | 8/2011 | Bestgen et al. |
| 8,037,059 B2 | 10/2011 | Bestgen et al. |
| 8,280,875 B2 | 10/2012 | Weissman et al. |
| 8,447,754 B2 | 5/2013 | Weissman et al. |
| 2004/0034616 A1 | 2/2004 | Witkowski et al. |
| 2006/0218123 A1 | 9/2006 | Chowdhuri et al. |
| 2008/0034181 A1 | 2/2008 | Basu et al. |
| 2009/0248631 A1 | 10/2009 | Alba et al. |
| 2012/0072414 A1 | 3/2012 | He |
| 2014/0101130 A1 | 4/2014 | Kang et al. |

(Continued)

OTHER PUBLICATIONS

PCT Foreign Search Report and Written Opinion for related matter PCT/US2014/055780 dated Dec. 24, 2014; 10 pp.

*Primary Examiner* — Isaac M Woo
(74) *Attorney, Agent, or Firm* — Armstrong Teasdale LLP

(57) ABSTRACT

A computer-based method for optimizing database queries is provided. The method uses a server computer device including a processor communicatively coupled to a database. The method includes receiving a main query requesting data from a partitioned database table within the database. The partitioned database table includes a plurality of partitions. The method also includes determining a partition list. The partition list includes two or more partitions of the plurality of partitions and excludes at least one partition of the plurality of partitions. The method further includes generating a plurality of sub-queries where each sub-query is associated with one partition included within the partition list, and processing each sub-query of the plurality of sub-queries on the associated partition included within the partition list.

20 Claims, 6 Drawing Sheets

(56) References Cited

U.S. PATENT DOCUMENTS

2015/0234895 A1* 8/2015 Erdogan .......... G06F 17/30466
707/714

* cited by examiner

SYSTEMS AND METHODS FOR OPTIMIZING DATABASE QUERIES

CROSS REFERENCE TO RELATED APPLICATIONS

This application claims the benefit of U.S. Provisional Application No. 61/878,300 filed Sep. 16, 2013, which is hereby incorporated by reference in its entirety.

BACKGROUND OF THE DISCLOSURE

The field of the disclosure relates generally to database queries and more particularly to systems and methods for optimizing database queries involving tables divided into multiple partitions.

Large database tables may be separated into multiple sub-tables, or "partitions," in order to improve performance or to enable aspects of cluster computing. Such partitioning may be implemented with a divisional scheme that groups data in each partition based on an attribute of the data (e.g., a field of the table, sometimes called a "partition field" or a "partition key"). For example, a table of weekly transactions may include a separate partition for each day of the week. As such, each partition includes only data related to a single day of the week.

Known database queries involving large database tables require querying all of the partitions in order to retrieve the data. Further, some queries may be formed using a filter (i.e., a limitation involving one or more fields of the table) that restricts certain rows of the table from the return result. In some instances, that filter field may also be the partition field.

BRIEF DESCRIPTION OF THE DISCLOSURE

In one embodiment, a computer-based method for optimizing database queries is provided. The method uses a server computer device including a processor communicatively coupled to a database. The method includes receiving a main query requesting data from a partitioned database table within the database. The partitioned database table includes a plurality of partitions. The method also includes determining by the processor a partition list. The partition list includes two or more partitions of the plurality of partitions and excludes at least one partition of the plurality of partitions. The method further includes generating by the processor a plurality of sub-queries. Each sub-query is associated with one partition included within the partition list. Moreover, the method includes processing each sub-query of the plurality of sub-queries on the associated partition included within the partition list.

In another embodiment, a server computing device for optimizing database queries is provided. The server computer device includes a processor communicatively coupled to a database. The server computing device is programmed to receive a main query requesting data from a partitioned database table within the database. The partitioned database table includes a plurality of partitions. The server computing device is also programmed to determine a partition list. The partition list includes two or more partitions of the plurality of partitions and excludes at least one partition of the plurality of partitions. The server computing device is further programmed to generate a plurality of sub-queries. Each sub-query is associated with one partition included within the partition list. Moreover, the server computing device is programmed to process each sub-query of the plurality of sub-queries on the associated partition included within the partition list.

In yet another embodiment, at least one non-transitory computer-readable storage media having computer-executable instructions embodied thereon is provided. When executed by a server computer device having at least one processor coupled to at least one memory device, the computer-executable instructions cause the processor to receive a main query requesting data from a partitioned database table within a database. The partitioned database table includes a plurality of partitions. The computer-executable instructions also cause the processor to determine a partition list. The partition list includes two or more partitions of the plurality of partitions and excludes at least one partition of the plurality of partitions. The computer-executable instructions further cause the processor to generate a plurality of sub-queries. Each sub-query is associated with one partition included within the partition list. Moreover, the computer-executable instructions cause the processor to process each sub-query of the plurality of sub-queries on the associated partition included within the partition list.

BRIEF DESCRIPTION OF THE DRAWINGS

FIG. 1 illustrates an example configuration of a server system that may be used for optimizing database queries as described herein.

FIG. 2 is a simplified block diagram of an example environment for optimizing database queries using the server system shown in FIG. 1.

FIG. 3 is an illustration of a database table that is managed by the database system shown in FIG. 2.

FIG. 4 is an example method for optimizing database queries using the database server shown in FIG. 3.

FIG. 5 is another example method for optimizing database queries using the database server shown in FIG. 3.

FIG. 6 illustrates an example configuration of a database within a computing device, along with other related computing components, that may be used for optimizing database queries as described herein.

DETAILED DESCRIPTION OF THE DISCLOSURE

Figure 1:
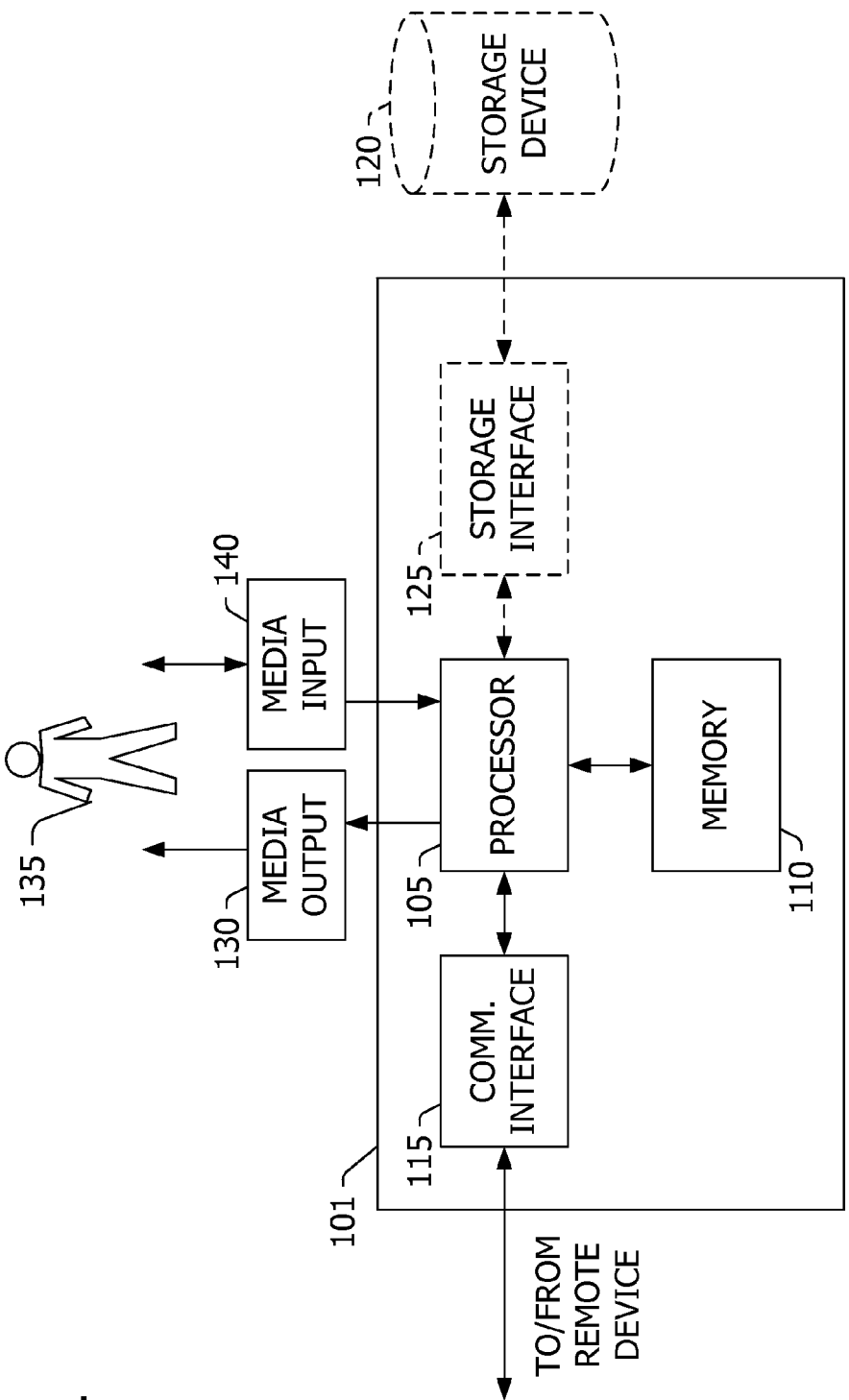
FIGS. 1-6 illustrate example embodiments of the methods and systems described herein.

Embodiments of the present disclosure facilitate optimization of database queries for database tables that are divided into multiple sub-tables, such as, for example, through the use of "database partitioning." Database partitioning involves the logical sub-division of a single database table, often a very large table, into multiple "partitions." Each partition contains a subset of the data, where each row within the table is put into one of the partitions. Data is logically divided into the partitions by a "partition key" (e.g., a single field of the table). For example, consider a transactions table that stores the past week's payment transactions data. The table may be partitioned into 7 separate partitions, one for each day of the past week. Each transaction (i.e., each row in the table) may have a "transaction date" field, and would thus be stored in one of the 7 partitions based on the day of the week defined by the "transaction date" (i.e., "transaction date" is the partition key).

Transactions involving a partitioned table may need to access many of the partitions. Queries submitted for a partitioned table may be divided into sub-queries, one for each partition. The results of each sub-query are subsequently combined and returned to the user. For example, a query may be submitted to the database requesting a total number of transactions for a particular payment account (i.e., "filter" the results based on a field "payment account number"). As such, the database forms sub-queries for each of the partitions based on the given filter field, collects the results from the sub-queries (i.e., the sub-totals for the payment account from each of the 7 partitions), and returns the total number of transactions for that payment account (i.e., the total of the sub-totals).

In one example embodiment, database queries for partitioned tables are discussed and classified in at least two respects: (1) filtering criteria; and (2) express partition inclusion criteria. As used herein, the terms "filter" and "filtering criteria" are used generally to refer to an operation performed on a database table that returns some subset of the rows within the table based on a set of logic configured to restrict the rows returned to meet a certain criteria (i.e., the filter criteria). The filter criteria are, therefore, the logic with which the rows are selected or de-selected for inclusion into the subset (i.e., the "return results"). As used herein, the term "partition elimination" refers to a process performed by a database that, for a given query, selects which partitions of the table will be excluded from participating in answering the query. If multiple partitions are involved, then each participating partition would have to answer a sub-query, and each non-participating partition would not have to answer a sub-query. Such queries on a partitioned database are dispatched as sub-queries to the participating partitions, and their results are aggregated or otherwise used to compute the return results.

In one embodiment, partition elimination criteria are defined by the query statement. More specifically, in one embodiment, the query statement performs partition elimination by receiving a specific list of partitions in the query statement. The list expressly states which partitions are to be included or excluded from participating in the query. In another embodiment, the list of participating partitions is determined dynamically during the processing of the query statement, such as through a "nested" select statement (i.e., a select statement embedded within a broader query, where the return results for the nested select define the list of partitions). As such, an administrator may increase performance of a query by selecting only certain partitions to use during the query, and additionally may exclude filtering criteria for one or more of the sub-queries that might otherwise have been required to provide the proper results.

In another embodiment, some partitions are automatically filter-exempted during the query. As used herein, the term "filter-exempted" or "exempt from filtering" refers to a parent query (i.e., a query submitted to a partitioned table) which includes filter criteria, and which includes one or more sub-queries (i.e., a query that is submitted to a single partition of the table) in which some of the sub-queries do not include the filter from the parent query. In certain queries, such as queries with a filter criterion involving the partition key, some partitions may not require filtering (i.e., they may be exempted from filtering because, for example, all of the data in the partition is within the scope of the filter). As such, performance aspects of the filter-exempted sub-queries are improved because these sub-queries need not take the computational time to filter.

The methods and systems described herein may be implemented using computer programming or engineering techniques including computer software, firmware, hardware, or any combination or subset. As disclosed above, at least one technical problem with known database queries is that prior queries to large partitioned databases are inefficient and require more processing than necessary. The systems and methods described herein address that technical problem. The technical effect of the systems and processes described herein is achieved by performing at least one of the following steps: (a) receiving a main query requesting data from a partitioned database table within the database, the partitioned database table includes a plurality of partitions; (b) determining a partition list based on the main query, where the partition list includes two or more partitions of the plurality of partitions and excludes at least one partition of the plurality of partitions, and where the main query expressly identifies two or more partitions of the plurality of partitions to include in the partition list; (c) generating a plurality of sub-queries, where each sub-query is associated with one partition included within the partition list; and (d) processing each sub-query of the plurality of sub-queries on the associated partition.

Alternatively or additionally, the systems and processes described herein achieve the technical effect by: (a) receiving a main query requesting data from a partitioned database table within the database, the partitioned database table includes a plurality of partitions, wherein the main query includes a filter criterion; (b) identifying partition information associated with the partitioned database table, the partition information including a partition key; (c) determining a partition list based, at least in part, on the partition key and the filter criterion, where the partition list includes two or more partitions of the plurality of partitions and excludes at least one partition of the plurality of partitions; (d) identifying at least one partition for filter-exemption based, at least in part, on the filter criterion and the partition key; (e) generating a sub-query for the at least one filter-exempted partition, the sub-query including the main query without the filter criterion; (f) generating a sub-query for each partition included in the partition list, the sub-query including the main query with the filter criterion; and (g) processing each sub-query of the plurality of sub-queries on the associated partition.

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium, such as a non-transitory computer readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to databases and database query processing.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 illustrates an example configuration of a server system 101 that may be used for optimizing database queries as described herein. Server system 101 includes a processor 105 for executing instructions. Instructions may be stored in a memory area 110, for example. Processor 105 may include one or more processing units (e.g., in a multi-core configuration) for executing instructions. The instructions may be executed within a variety of different operating systems on the server system 101, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 105 is operatively coupled to a communication interface 115 such that server system 101 is capable of communicating with a remote device such as a user system or another server system 101. Communication interface 115 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Processor 105 may also be operatively coupled to a storage device 120. Storage device 120 is any computer-operated hardware suitable for storing and/or retrieving data. In some embodiments, storage device 120 is integrated in server system 101. For example, server system 101 may include one or more hard disk drives as storage device 120. In other embodiments, storage device 120 is external to server system 101 and may be accessed by a plurality of server systems 101. For example, storage device 120 may include multiple storage units such as hard disks or solid state disks in a redundant array of inexpensive disks (RAID) configuration. Storage device 120 may include a storage area network (SAN) and/or a network attached storage (NAS) system.

In some embodiments, processor 105 is operatively coupled to storage device 120 via a storage interface 125. Storage interface 125 is any component capable of providing processor 105 with access to storage device 120. Storage interface 125 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 105 with access to storage device 120.

Server system 101 may also include at least one media output component 130 for presenting information to a user 135. Media output component 130 is any component capable of conveying information to user 135. In some embodiments, media output component 130 includes an output adapter such as a video adapter and/or an audio adapter. An output adapter is operatively coupled to processor 105 and operatively couplable to an output device such as a display device, a liquid crystal display (LCD), organic light emitting diode (OLED) display, or "electronic ink" display, or an audio output device, a speaker or headphones.

In some embodiments, server system 101 includes an input device 140 for receiving input from user 135. Input device 140 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 130 and input device 140.

Memory area 110 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are for example only, and are thus not limiting as to the types of memory usable for storage of a computer program.

Stored in memory area 110 are, for example, computer readable instructions for providing a user interface to user 135 via media output component 130 and, optionally, receiving and processing input from input device 140. A user interface may include, among other possibilities, a web browser and client application. Web browsers enable users, such as user 135, to display and interact with media and other information typically embedded on a web page or a website from server system 101. A client application allows user 135 to interact with a server application from server system 101. For example, instructions may be stored by a cloud service, and the output of the execution of the instructions sent to the media output component 130.

Figure 4:
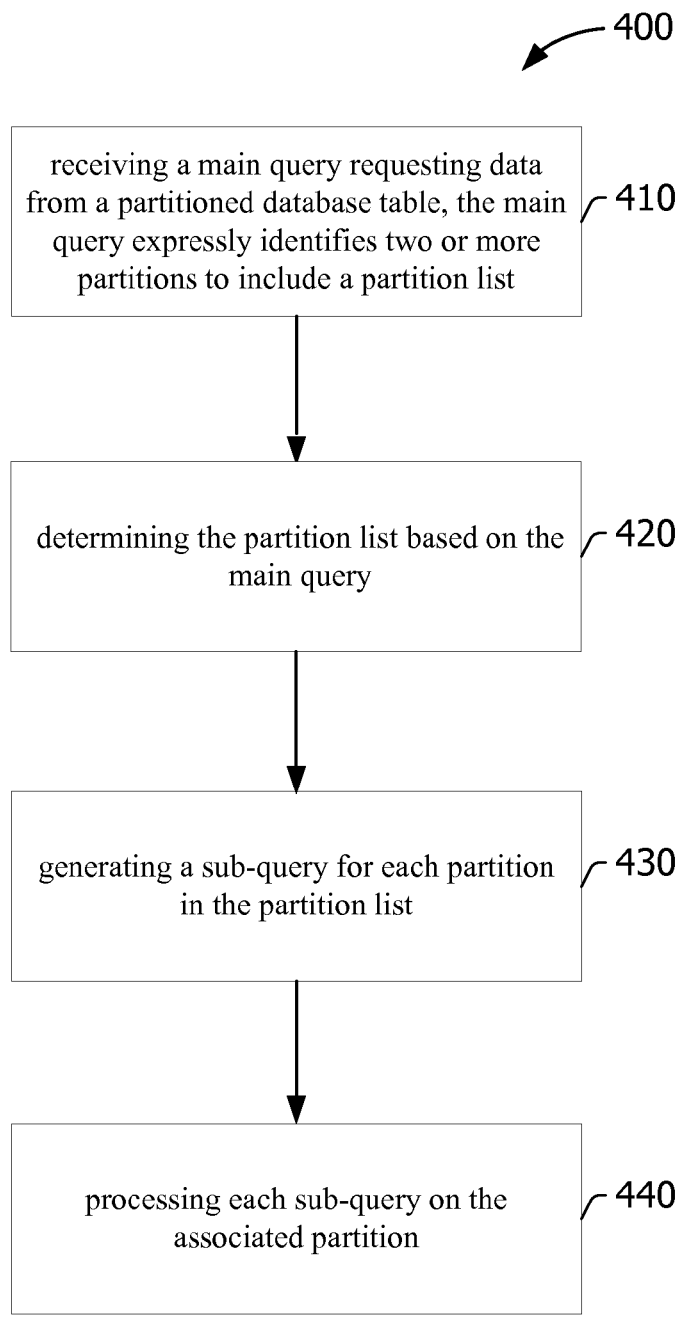
Figure 5:
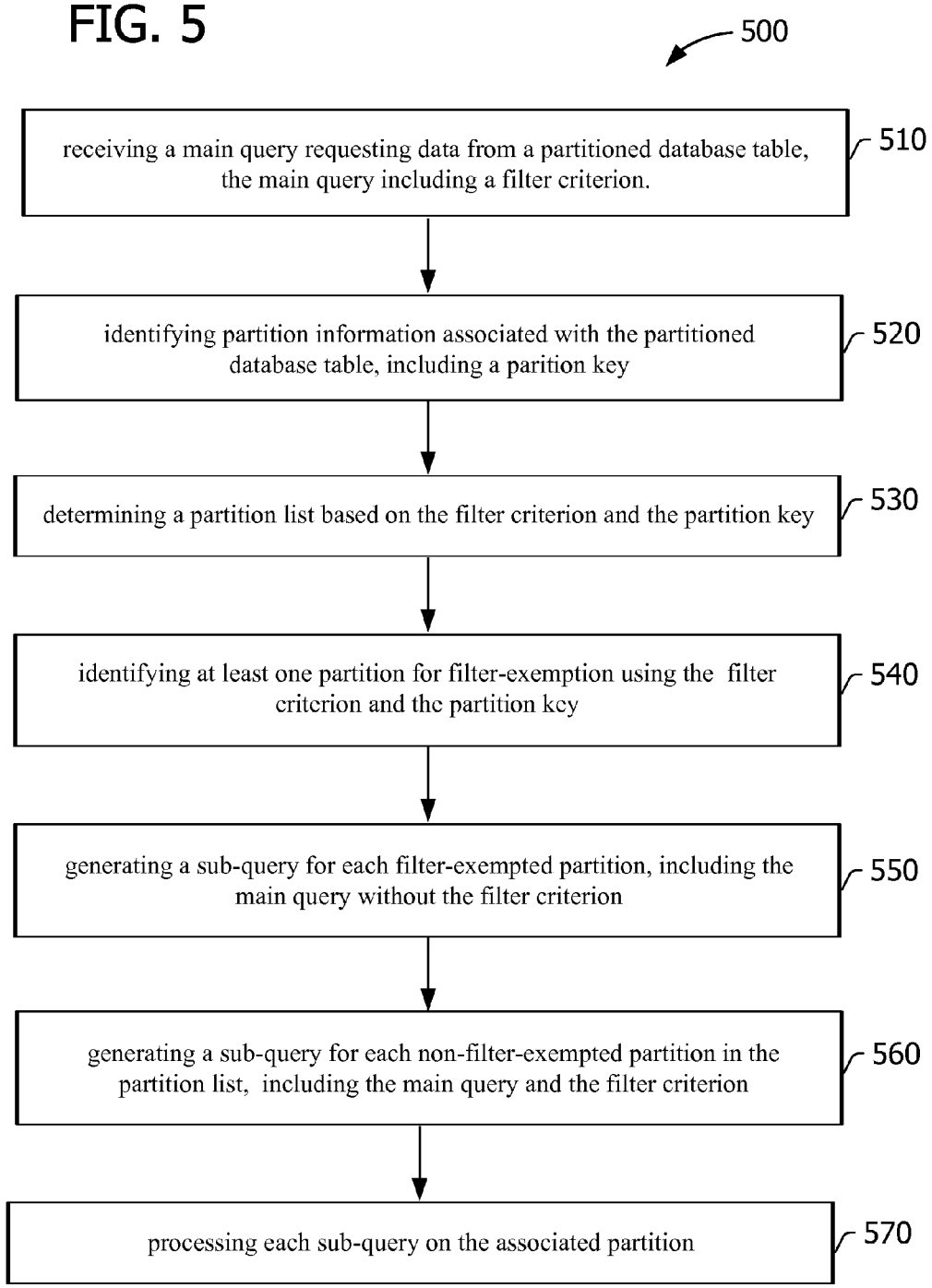

Processor 105 executes computer-executable instructions for implementing aspects of the disclosure. In some embodiments, processor 105 is transformed into a special purpose microprocessor by executing computer-executable instructions or by otherwise being programmed. For example, processor 105 is programmed with the instruction such as illustrated in FIGS. 4 & 5.

Figure 2:
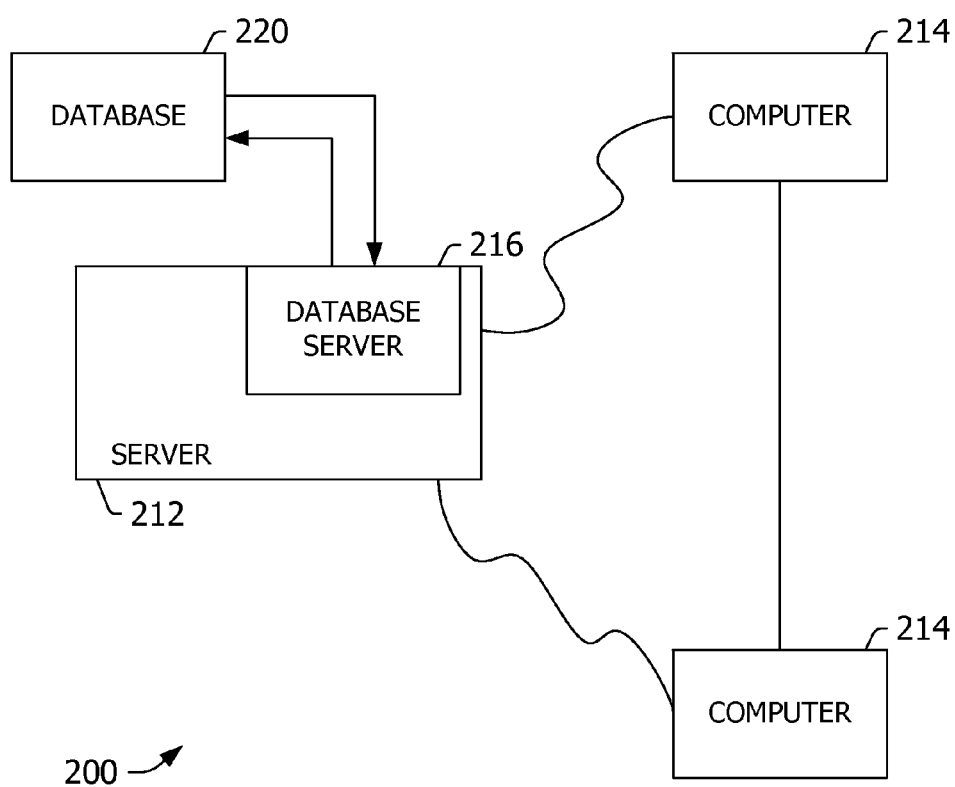

FIG. 2 is a simplified block diagram of an example environment 200 for optimizing database queries using server system 101 (shown in FIG. 1). In the example embodiment, environment 200 includes a server system 212, and a plurality of client sub-systems, also referred to as client systems 214, connected to server system 212. In one some embodiments, server system 212 is similar to server system 101. In one embodiment, client systems 214 are computers including a web browser, such that server system 212 is accessible to client systems 214 using the Internet. Client systems 214 are interconnected to the Internet through many interfaces including a network, such as a local area network (LAN) or a wide area network (WAN), dial-in-connections, cable modems and special high-speed ISDN lines. Client systems 214 could be any device capable of interconnecting to the Internet including, but not limited to, a desktop computer, a laptop computer, a personal digital assistant (PDA), a cellular phone, a smartphone, a tablet, a phablet, or other web-based connectable equipment. A database server 216 is connected to a database 220 containing information on a variety of matters, as described below in greater detail. In one embodiment, centralized database 220 is stored on server system 212 and can be accessed by potential users at one of client systems 214 by logging onto server system 212 through one of client systems 214. In an alternative embodiment, database 220 is stored remotely from server system 212 and may be non-centralized.

In the example embodiment, database server 216 includes a query engine (not separately shown). During operation, the query engine is the component of database server 216 that receives database queries from users or other computing devices or applications. The query engine receives database queries formed, for example, with a structured query language (SQL). The query engine receives queries, processes the queries by performing computations and other database access operations that may retrieve and process data from database 220. In the example embodiment, database server 216 and the query engine are configured to enable "database partitioning," as described in greater detail below.

Figure 3:
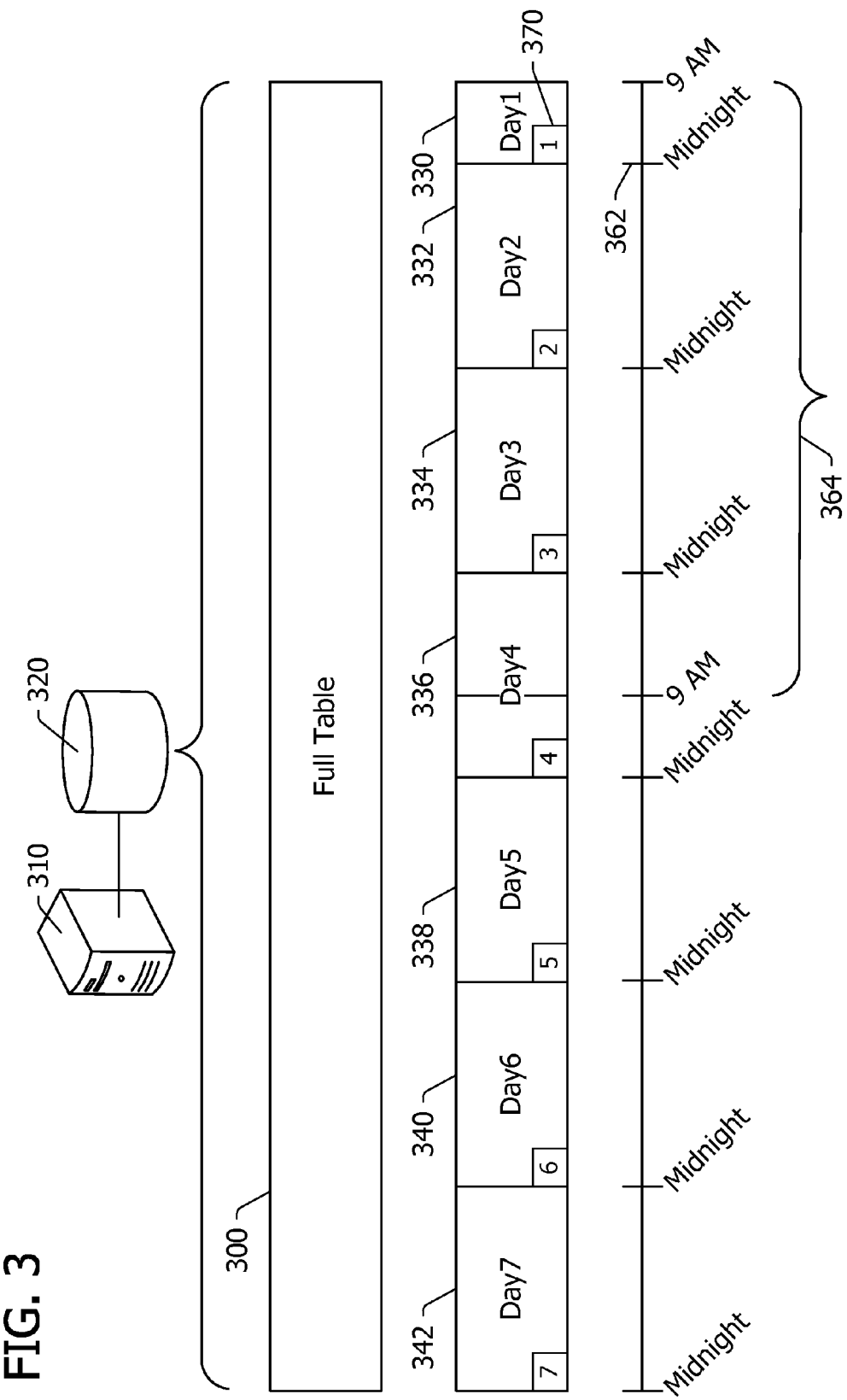

FIG. 3 is an illustration of a database table 300 that is managed by a database system 310. In some embodiments, database server 310, also known as a database computing device, is similar to database server 216 (shown in FIG. 2), server system 212 (shown in FIG. 2), and/or server system 101 (shown in FIG. 1). In the example embodiment, database server 310 manages a database 320 which contains table 300. In some embodiments, database 320 is similar to database 220 (shown in FIG. 2). In the example embodiment, database server 310 includes a query engine (not separately shown) such as described above in reference to FIG. 2.

In the example embodiments described herein, database server 310 and the query engine are configured to enable "database partitioning." In many known RDBMS's, data is logically grouped into structures called "tables." A single table has a database structure that defines at least the name and data type of one or more "fields" of data to be stored within the table (i.e., the "columns" of the data). Each record (i.e., row) of data has elements (i.e., cells) conforming to the field definitions of that table. In database partitioning, a single table is at least logically divided into a plurality of sub-tables, or "partitions." Each record appears in one and only one partition. A "partition key" identifies, for each particular row, the partition in which the row will be stored. The partition key may be, for example, a particular field within the table structure. On other embodiments, the partition key could be an attribute, a column, a name, or a field.

In some embodiments, how the data is divided between the various partitions (i.e., how the data is partitioned, sometimes called the "partitioning criteria") is defined by one of: range partitioning, list partitioning, hash partitioning, and composite partitioning. In range partitioning, for example, database server 310 defines multiple partitions associated with the table, a partition key (i.e., a particular field of the table, column of the table, attribute of the table, or name used in the table), and each partition is configured with a range of values for the partition key. As such, when a new row is inserted into the table, database server 310 analyzes the partition key field of the new row, compares it to the ranges of the partitions, and inserts the new row into the partition that matches. In list partitioning, a list of one or more discrete values is defined for each partition. When a new row is inserted, database server 310 analyzes the partition key field of the new row, compares it to the lists associated with each partition, and inserts the new row into the partition that matches. In hash partitioning, the new row's partition key field value undergoes a mathematical operation (i.e., a "hash") that computes a resulting hash value for the row. Each partition is associated with only some of the possible hash values and, as such, the hash value defines the partition into which the new row will be inserted. In composite partitioning, the destination partition for new rows may be determined by a more complex computation, such as some combination of partition key fields, or some combination of partitioning criteria.

Further, in some embodiments, database server 310 generates a plurality of sub-queries for each "main" query that is received for table 300. More specifically, when database server 310 receives a query (main query) against table 300, database server 310 generates a sub-query for one or more of partitions 330-342. In some embodiments, database server 310 customizes each sub-query specifically for each individual partition 330-342. In other embodiments, the same query is used for each of the sub-queries. And in still other embodiments, the sub-query is the same as the query. In the example embodiment, once the sub-queries are formed, database server 310 processes each sub-query on its associated partition. As used herein, the term "applied to" in reference to tables, partitions, or other logical groupings of data, generally means that the particular table/partition is used to satisfy, or "answer", a query and/or sub-query. Each sub-query returns a set of data that represents the results of the sub-query as applied to the partition. Database server 310 combines the results of each sub-query to prepare the final set of results that is returned for the main query.

In the example embodiment, table 300 is a table that stores payment transactions (i.e., each row of data representing a single payment transaction). Table 300 has a database structure (not separately shown) that includes a "payment date" field (i.e., a date/time at which the particular payment transaction occurred). Further, table 300 is a horizontally-partitioned table (i.e., each partition contains full records such that each record appears in its entirety in one and only one partition). Table 300 has 7 distinct partitions, "Day1" 330, "Day2" 332, "Day3" 334, "Day4" 336, "Day5" 338, "Day6" 340, and "Day7" 342. Table 300 uses a "payment date" field, at least partially, as part of a partition key. Accordingly, any payment with a payment date occurring during today's date (e.g., day 1) is stored within the partition "Day1" 330. Any payment occurring yesterday (e.g., day 2) is stored within partition "Day2" 332, and so on for each of the 7 days of the past week. Thus, each row of the past week's transaction data is stored within one and only one of partitions 330-342 based on the date the payment transaction occurred (i.e., the table is structured with a "daily partitioning" scheme).

In the example illustration shown in FIG. 3, a timeline 360 is also presented. Timeline 360 is used for illustrative purposes to show the delineation of each partition by time of the day. Presume that, at the time of the example, the time is 9:00 AM (e.g., 9:00 AM of Day1). "Midnight" marks 362 are aligned to illustrate the border between days (i.e., partitions) based on the payment date.

Further, in the example embodiment, consider a query asking for the total number of transactions in the last 3 days (e.g., in pseudo-code, "for transaction date>(todays date/time minus 72 hours)"). In SQL, this may look like the following:

> Select count(*)from weekly_transaction where payment_date>sysdate−3.

In the example SQL query, table 300 is named "weekly_transaction", and the date of the payment (also the primary key) is named "payment_date". Further, the text "where payment_date>sysdate−3" is a filter criterion, "sysdate" represents today's date/time (i.e., the system date/time dynamically generated and inserted at the time the query is submitted for processing), and "sysdate−3" represents subtracting 3 days (i.e., 72 hours) from the current date/time. Further, it should be noted that this query includes a filter criterion involving the date of the transaction (i.e., query will count transactions only if they occur in the last 72 hours).

In the example embodiment, this query also includes a partition elimination criterion because the filter criteria (e.g., the date of the transaction) involves how the table is partitioned (i.e., the partition key) (i.e., query does not need to include any data in some of the partitions). Because of the presence of partition elimination criteria, some of the partitions (e.g., associated with the oldest 3 days of data, call them Day5, Day6, and Day7) need not be consulted in order to answer this query because none of the last 72 hours' data is going to be within them. Database server 310 determines the partitions that need to be consulted to form a partition list (also known as partition set or a set of partitions), where all of the data for this query is within the partition list (i.e., Day4, Day3, Day2, and Day1, the present day's partition containing a partial day's data). As such, database server 310 submits sub-queries to each of these 4 partitions, and the other 3 partitions will be ignored because they include no data relevant to the query.

In one embodiment, database server 310 receives express partition inclusion criteria as a part of the query. As used herein, the term "express partition inclusion criteria" refers to criteria provided in a main query statement that defines which partitions to include in answering the main query. The modifier "express", in reference to partition inclusion, refers to the partition list being included or provided as a part of the main query, as opposed to some known systems for partition exclusion in which partition exclusion is inferred. For example, an SQL query statement includes a "partition inclusion" list defining a set of partitions to which the SQL statement will apply (i.e., each partition in the partition inclusion list will be considered for the query, and each partition not in the partition list will be excluded from the query). In some embodiments, the partition list is a pre-defined list (i.e., the list is expressly given in the original SQL query statement). For example, consider a modification to the above SQL query example:

> Select count(*) from weekly_transaction partition_list (Day1, Day2, Day3, Day4)
> where payment_date > sysdate − 3.

In this example, the text "partition_list (Day1, Day2, Day3, Day4)" is the express partition inclusion information in the query and, more specifically, is a pre-defined list. The reserved word "partition_list" is used to indicate a list of partitions that follow. In processing the example main query, database server 310 excludes the other partitions (i.e., Day5, Day6, and Day7) from processing. In other words, Day5, Day6, and Day7 will not receive sub-queries because of the express partition inclusion information defined by the main query.

In another embodiment, the partition list is a dynamic list (i.e., a list determined during the processing of the main query). For example, consider another modification to the original SQL query example:

> Select count(*) from weekly_transaction
> Partition_list (select partition_name from tab_partitions
> where partition_position <= 4)
> where payment_date > sysdate − 3.

In this example, the text "partition_list (select partition_name from tab_partitions where partition_position <=4)" is the express partition inclusion information in the query and, more specifically, is a dynamic list, and identifies more than a single partition. Database server 310 dynamically determines the partition list during processing of the query through the processing of this example nested select statement. In other words, database server 310 pre-processes the nested select to generate the list, and then use that dynamically generated list to process the main query, as described above. In the example embodiment, "tab_partitions" is a table defining information associated with the partitions of table 300 "weekly_transactions", of which "partition_name" and "partition_position" are fields. "partition_name" is a character-based name of a partition (e.g., "Day1", "Day2", etc.), and "partition_position" 370 is an integer index unique to each partition of table 300. Presume partition "Day1" has "partition_position=1", "Day2" has "partition_position=2", and so on for all 7 partitions. As such, the example nested select dynamically generates a list similar to the previous example (i.e., a list containing "Day1", "Day2", "Day3", and "Day4" partitions).

In the example embodiment, database server 310 processes express partition inclusion prior to partition elimination. In other embodiments, database server 310 performs partition elimination prior to express partition inclusion. And in still other embodiments, database server 310 performs express partition inclusion but does not perform partition elimination.

Still referring to FIG. 3, in other embodiments, database server 310 exempts some partitions from one or more of the filter criteria of the main query (a process referred to herein as "filter-exemption"). In other words, the main query's filter criteria may not be applied to one or more "exempted" partitions. More specifically, as database server 310 generates sub-queries for each applicable partition (as described above), a sub-query for an exempted partition will not include one or more filter criteria of the main query. This exemption from filtering may be performed in situations in which all of a particular partition's data is completely within the filter criteria. In other words, because of the nature of the filter, some partitions may be considered "pre-filtered" because, based on how the partition was constructed and managed, none of the data within the partition would be excluded by the filter even if the filter was applied to the partition's sub-query.

For example, consider partitioned table 300 and a main query:

> Select count(*)from weekly_transaction where
> payment_date>sysdate−3

As described above, the filter criteria for this select statement is described by the text "where payment_date>sysdate−3". As such, this main query defines a request addressing all data in table 300 where the transaction date "payment_date" is less than 72 hours old. Presume the date/time that the main query is submitted is on Day1 at time 09:00 AM. This means that the main query needs to return data ranging back to 09:00 AM of Day4. In other words, in order to answer this query, database server 310 must consider all of the data in Day1 330, all of the data in Day2 332, all of the data in Day3 334, but only some of the data in Day4 336 (i.e., data from Day4 in the range 09:00 AM to 11:59 PM, as illustrated by range 364 on FIG. 3).

To perform filter-exemption, in the example embodiment, database server 310 analyzes the filter criteria (i.e., "payment_date>sysdate−3"), identifies that the object of the filter criteria is the field "payment_date", and compares this filter object to the partition information for table 300 (i.e., the information defining how table 300 is partitioned). In this example, table 300 is partitioned based on the "payment_date" field (i.e., partition key is "payment_date"). Because the filter object is associated with the way table 300 is partitioned, database server 310 performs further analysis. Table 300, in the example, is range-partitioned based on "payment_date". More particularly, each partition only spans a certain range (e.g., Day2 only contains 24 hours of data, ranging from midnight on day 2 to midnight on day 1 (where "day 1" is the day that the query is processed, "day 2" is the prior day, and so forth). Further, the filter criteria is a range-based inclusion criteria (i.e., defining a range in which data is to be included).

In the example embodiment, database server 310 analyzes, for each partition, whether that partition can possibly include any records of data that are defined by the filter criteria. More specifically, database server 310 does not look at the data contents within the partition but, rather, examines only data about the structure of the partitions and how the partitions were built (i.e., "partition meta-data" or partition information, for example the data defined in the example table "tab_partitions"). For example, for the Day1, Day2, and Day3 sub-queries, there is no need to filter the rows based on the filter criterion. Because of the logical division of data within the partitions and the particular nature of the example filter, all of the data in Day1, Day2, and Day3 partitions 330, 332, and 334 are determined to be within the scope of this query (i.e., they all satisfy the filter, and thus none of the records within those three partitions would be removed from consideration by the filter if it were applied). The only sub-query that may need further filtering is Day4. Because not all of the Day4 partition is necessarily within scope of the filter (i.e., there may be some records in Day4 336 prior to 09:00 AM that need to be filtered out), the sub-query created by database server 310 for partition Day4 336 includes the filter.

Further, in some embodiments, database server 310 may selectively limit which filter criteria are exempted during the filter-exemption process. In other words, some filter criteria from a main query may be excluded from a partition's sub-query, while other filter criteria may still be included. For example, consider partitioned table 300 and main query:

> Select count(*) from weekly_transaction
> where payment_date > sysdate − 3 and tran_type = 5

In this main query example, "tran_type" refers to a transaction type identifier field within table 300 and, in the example embodiment, "tran_type" has no relation to how table 300 is partitioned. In other words, each partition could contain records with any values for tran_type. Further, as described above, "payment_date" is associated with the underlying partitioning of table 300. In the example embodiment, database server 310 identifies two filter criteria: "payment_date>sysdate−3" and "tran_type=5". Database server 310 processes the payment_date criterion as above (i.e., eliminating that filter criterion from the Day1, Day2, and Day3 sub-queries). However, database server 310 does not eliminate the second criterion "tran_type=5" from any of the sub-queries. Because the rows in any of the 4 partitions could have any value for tran_type, that criterion is still applied to all of the sub-queries (i.e., only rows with tran_type=5 are desired). As such, filter criteria are not excluded if those criteria are not necessarily already applied to particular partitions.

While the above example uses range partitioning and a range-based filter criterion, it should be understood that the systems and methods described herein may be implemented with other combinations of partitioning types and/or filter criteria types. For example, database server 310 may manage a "list partitioned" table and receive filter criteria that include discrete elements that are members of the partition key list (i.e., that are used to decide in which partitions records reside).

Further, it should be understood that the process of filter-exemption may be practiced together with, or independently from, the above-described partition elimination and express partition inclusion aspects. Additionally, it should be understood that, while the examples above describe filter criteria as filtering by inclusion (i.e., the "where" clause is selecting what rows it wants returned, as opposed to what rows it does not want returned), any combination of filtering by inclusion, by exclusion, or any combination of such, that enables the operation of the systems and methods described herein may be used.

FIG. 4 is an example method 400 for optimizing database queries using database server 310 (shown in FIG. 3). In the example embodiment, method 400 includes the situation where the main query "expressly" lists the partitions to be queried. Database server 310 receives 410 a main query requesting data from partitioned database table 300 within the database 320 (both shown in FIG. 3). Partitioned database table 300 includes a plurality of partitions, e.g., 330-342 as shown in FIG. 3. The main query expressly identifies two or more partitions of the plurality of partitions to include in a partition list. Database server 310 determines 420 the partition list based on the main query. The partition list includes two or more partitions in the plurality of partitions and excludes at least one partition of the plurality of partitions. In the example embodiment, the partition list includes the partitions expressly identified in the main query. In other embodiments, the partition list also includes other partitions that database server 310 determined 420 were necessary to include in the partition list. Database server 310 generates 430 a sub-query for each partition in the partition list. Database server 310 processes 440 each sub-query on the associated partition. In the example embodiment, database server 310 aggregates (not shown) the results of the sub-queries to generate a response to the main query.

FIG. 5 is another example method 500 for optimizing database queries using database server 310 (shown in FIG. 3). In the example embodiment, method 500 includes the situation where the main query does not list the partitions to be queried and further includes filter criteria that might not apply to all of the partitions to be queried. Database server 310 receives 510 a main query requesting data from partitioned database table 300 within the database 320 (both shown in FIG. 3). Partitioned database table 300 includes a plurality of partitions, e.g., 330-342 as shown in FIG. 3. The main query includes a filter criterion. Database server 310 identifies 520 partition information associated with the partitioned database table. The partition information includes a partition key. As described above, the partition key identifies in which partition information is stored. Database server 310 determines 530 the partition list based on the filter criterion and the partition key. The partition list includes two or more partitions in the plurality of partitions and excludes at least one partition of the plurality of partitions. Database server 310 identifies 540 at least one partition for filter-exemption using the filter criterion and the partition key. In the example embodiment, the at least one partition identified is from the partition list. The identified partitions do not require being processed with the filter criterion. For example, the filter criterion may be for transactions for the last three days that occurred before 11 am and the identified partition (e.g., partition 330 shown in FIG. 3) only includes transactions up until 9 am. So this partition is filter exempt.

Database server 310 generates 550 a sub-query for each filter-exempted partition. These sub-queries include the main query, but not the filter criterion. Database server 310 generates 560 a sub-query for each other partition in the partition list. These sub-queries include the main query and the filter criterion. Database server 310 processes 570 each sub-query on the associated partition. In the example embodiment, database server 310 aggregates (not shown) the results of the sub-queries to generate a response to the main query.

Figure 6:
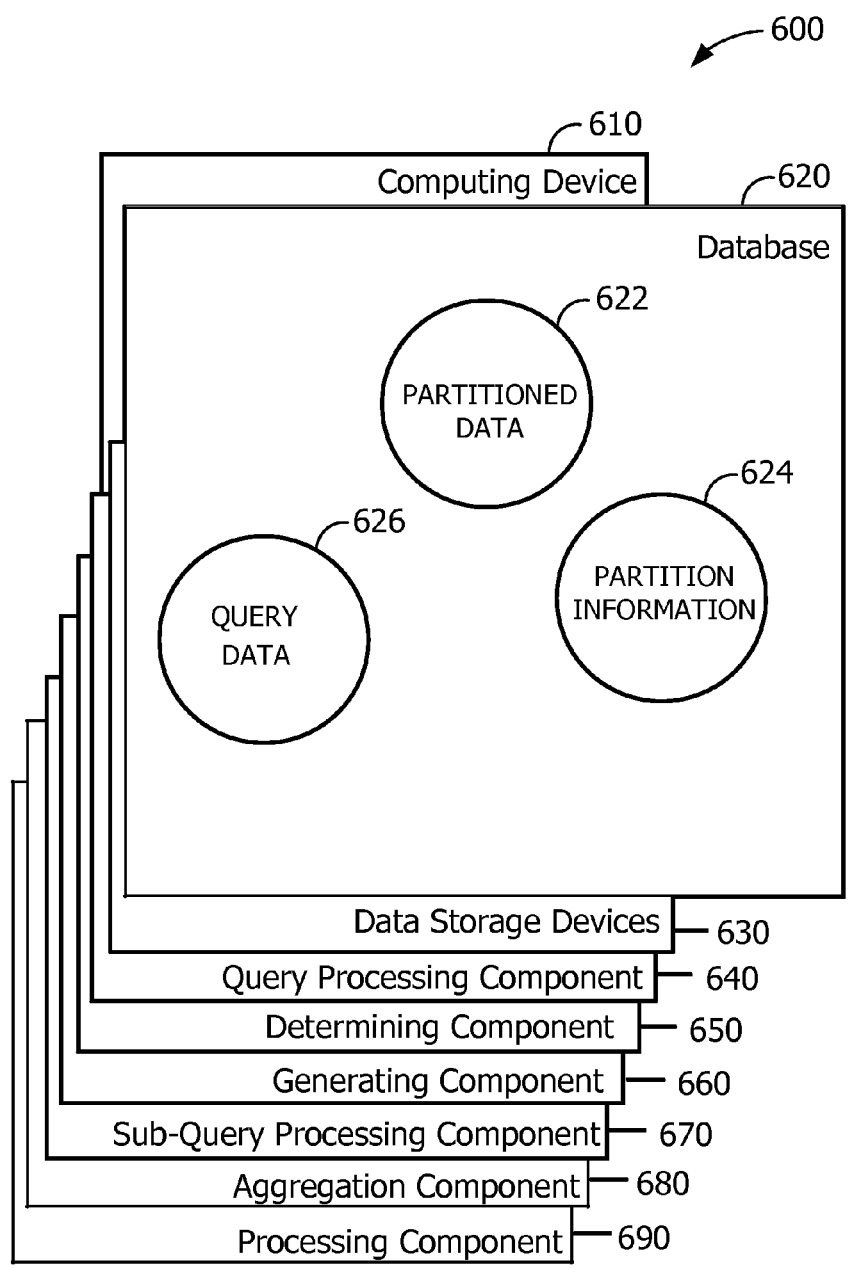

FIG. 6 illustrates an example configuration 600 of a database 620 within a computing device 610, along with other related computing components, that may be used for optimizing database queries as described herein. Database 620 is coupled to several separate components within computing device 610, which perform specific tasks. In the example embodiment, computing device 610 could be server system 101 (shown in FIG. 1), server system 212 (shown in FIG. 2), and/or database server 310 (shown in FIG. 3).

In the example embodiment, database 620 includes partitioned data 622, partition information 624, and query data 626. Partitioned data 622 includes the database table which has been divided into multiple partitions that is operated on by the systems and methods herein, such as table 300 (shown in FIG. 3). Partition information 624 includes information associated with the partitioning of tables. Query data 626 includes data associated with queries submitted to database 620 and query processing. In some embodiments, database 620 is similar to database 220 (shown in FIG. 2) and/or database 320 (shown in FIG. 3).

Computing device 610 includes the database 620, as well as data storage devices 630. Computing device 610 also includes a query processing component 640 for receiving and processing database queries. Computing device 610 also includes a determining component 650 for determining the partitions to include in the partition list. Computing device 610 further includes a generating component 660 for generating sub-queries for the partitions. Moreover, a sub-query processing component 670 is included for processing sub-queries associated with partitioned tables. In addition, an aggregation component 680 is included for aggregating results from sub-query processing component 670. A processing component 690 assists with execution of computer-executable instructions associated with the system.

The embodiments illustrated and described herein as well as embodiments not specifically described herein but within the scope of aspects of the disclosure constitute example means for optimizing database queries. For example, the database system 310 shown in FIG. 3, or any other similar computer device, programmed with computer-executable instructions constitutes example means for optimizing database queries.

It should be noted that database queries may be optimized in several respects. Providing a mechanism to allow a database administrator or other user of the database to specific which partitions a particular query should use provides a manual mechanism for users to increase performance by avoiding some filtering aspects through use of the built-in filtering that is applied to partitioned tables. Additionally, an automated system that recognizes the built-in filtering aspects of partitioned tables allows an optimizer to exclude certain filter criteria from use in sub-queries. Both benefits, thus, enable performance gains when using partitioned tables.

In one embodiment, a computer program is provided, and the program is embodied on a computer readable medium and utilizes a Structured Query Language (SQL) with a client user interface front-end for administration and a web interface for standard user input and reports. In an example embodiment, the system is web enabled and is run on a business-entity intranet. In yet another embodiment, the system is fully accessed by individuals having an authorized access outside the firewall of the business-entity through the Internet. In a further example embodiment, the system is being run in a Windows® environment (Windows is a registered trademark of Microsoft Corporation, Redmond, Wash.). The application is flexible and designed to run in various different environments without compromising any major functionality.

The systems and processes are not limited to the specific embodiments described herein. In addition, components of each system and each process can be practiced independent and separate from other components and processes described herein. Each component and process also can be used in combination with other assembly packages and processes.

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is identifying a consumer account, creating a model data file associated with a payment card, and configuring one or more physical components of the payment card. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. In other words, the machine-readable medium and the computer-readable medium described herein are non-transitory. The term "machine-readable signal" refers to any signal used to provide machine instructions and/or data to a programmable processor.

The above-described embodiments of methods and systems of optimizing database queries. As a result, the methods and systems described herein facilitate optimizing database queries.

This written description uses examples to disclose the embodiments, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-based method for optimizing database queries, the method implemented using a server computer device including a processor communicatively coupled to a database, said method comprising:
   receiving a main query requesting data from a partitioned database table within the database, the partitioned database table includes a plurality of partitions;
   determining, by the processor, a partition list, wherein the partition list includes two or more partitions of the plurality of partitions and excludes at least one partition of the plurality of partitions;
   generating, by the processor, a plurality of sub-queries, wherein each sub-query is associated with one partition included within the partition list; and
   processing each sub-query of the plurality of sub-queries on the associated partition included within the partition list.

2. The method in accordance with claim 1, wherein the main query expressly identifies two or more partitions of the plurality of partitions to include in the partition list, and wherein determining a partition list is based on the main query.

3. The method in accordance with claim 1, further comprising identifying partition information associated with the partitioned database table, the partition information including a partition key, and wherein determining a partition list is based, at least in part, on the partition key.

4. The method in accordance with claim 3, wherein the main query includes a filter criterion and wherein determining a partition list is based, at least in part, on the filter criterion and the partition key.

5. The method in accordance with claim 4, further comprising generating a sub-query for each partition included in the partition list, the sub-query including the main query with the filter criterion.

6. The method in accordance with claim 5, further comprising:
   identifying at least one partition for filter-exemption based, at least in part, on the filter criterion and the partition key;
   generating a sub-query for the at least one filter-exempted partition, the sub-query including the main query without the filter criterion; and
   processing the sub-query on the at least one filter-exempted partition.

7. The method in accordance with claim 6, wherein identifying at least one partition for filter-exemption further comprises:
   comparing the filter criterion to the partition information for each partition in the partition list;
   for each partition where there is no match between the filter criterion and the partition, determining that the partition is filter-exempted; and
   for each partition where there is a match between the filter criterion and the partition, determining that the partition is not filter-exempted.

8. A server computing device for optimizing database queries, said server computer device comprising a processor communicatively coupled to a database, said server computing device programmed to:
   receive a main query requesting data from a partitioned database table within the database, the partitioned database table includes a plurality of partitions;
   determine a partition list, wherein the partition list includes two or more partitions of the plurality of partitions and excludes at least one partition of the plurality of partitions;
   generate a plurality of sub-queries, wherein each sub-query is associated with one partition included within the partition list; and
   process each sub-query of the plurality of sub-queries on the associated partition included within the partition list.

9. The server computer device in accordance with claim 8, wherein the main query expressly identifies two or more partitions of the plurality of partitions to include in the partition list, and wherein the server computer device is further programmed to determine the partition list based on the main query.

10. The server computer device in accordance with claim 8, wherein the server computer device is further programmed to:
   identify partition information associated with the partitioned database table, the partition information including a partition key; and
   determine a partition list based, at least in part, on the partition key.

11. The server computer device in accordance with claim 10, wherein the main query includes a filter criterion and wherein the server computer device is further programmed to determine a partition list based, at least in part, on the filter criterion and the partition key.

12. The server computer device in accordance with claim 11, wherein the server computer device is further programmed to generate a sub-query for each partition included in the partition list, the sub-query including the main query with the filter criterion.

13. The server computer device in accordance with claim 12, wherein the server computer device is further programmed to:
   identify at least one partition for filter-exemption based, at least in part, on the filter criterion and the partition key;
   generate a sub-query for the at least one filter-exempted partition, the sub-query including the main query without the filter criterion; and
   process the sub-query on the at least one filter-exempted partition.

14. The server computer device in accordance with claim 13, wherein the server computer device is further programmed to:
   compare the filter criterion to the partition information for each partition in the partition list;
   for each partition where there is no match between the filter criterion and the partition, determine that the partition is filter-exempted; and
   for each partition where there is a match between the filter criterion and the partition, determine that the partition is not filter-exempted.

15. At least one non-transitory computer-readable storage media having computer-executable instructions embodied thereon, wherein when executed by a server computer device having at least one processor coupled to at least one memory device, the computer-executable instructions cause the processor to:
   receive a main query requesting data from a partitioned database table within a database, the partitioned database table includes a plurality of partitions;
   determine a partition list, wherein the partition list includes two or more partitions of the plurality of partitions and excludes at least one partition of the plurality of partitions
   generate a plurality of sub-queries, wherein each sub-query is associated with one partition included within the partition list; and
   process each sub-query of the plurality of sub-queries on the associated partition included within the partition list.

16. The computer-readable storage medium of claim 15, wherein the main query expressly identifies two or more partitions of the plurality of partitions to include in the partition list, and wherein the computer-executable instructions further cause the processor to determine the partition list based on the main query.

17. The computer-readable storage medium of claim 15, wherein the computer-executable instructions further cause the processor to:
   identify partition information associated with the partitioned database table, the partition information including a partition key; and
   determine a partition list based, at least in part, on the partition key.

18. The computer-readable storage medium of claim 17, wherein the main query includes a filter criterion and wherein the computer-executable instructions further cause the processor to determine a partition list based, at least in part, on the filter criterion and the partition key.

19. The computer-readable storage medium of claim 18, wherein the computer-executable instructions further cause the processor to generate a sub-query for each partition included in the partition list, the sub-query including the main query with the filter criterion.

20. The computer-readable storage medium of claim 19, wherein the computer-executable instructions further cause the processor to:
   identify at least one partition for filter-exemption based, at least in part, on the filter criterion and the partition key;
   generate a sub-query for the filter-exempted partition, the sub-query including the main query without the filter criterion; and
   process the sub-query on the filter-exempted partition.

* * * * *